United States Patent [19]

Barcell

[11] 4,003,502
[45] Jan. 18, 1977

[54] ADJUSTABLE SWEEPING APPARATUS FOR FEED GRINDERS AND THE LIKE

[75] Inventor: Ernest A. Barcell, Lafayette, Colo.

[73] Assignee: Easy Engineering Corporation, Broomfield, Colo.

[22] Filed: Nov. 17, 1975

[21] Appl. No.: 632,264

Related U.S. Application Data

[63] Continuation-in-part of Ser. No. 539,821, Jan. 9, 1975, abandoned.

[52] U.S. Cl. ............................... 222/168; 241/224; 259/30
[51] Int. Cl.² ......................................... B65G 65/48
[58] Field of Search .......... 214/17 R, 17 D, 17 DA; 222/167–172; 259/3, 14–16, 30–34, 175–177; 241/224, 225

[56] References Cited

UNITED STATES PATENTS

| | | | |
|---|---|---|---|
| 2,650,745 | 9/1953 | Oberwortman | 222/168 X |
| 2,767,884 | 10/1956 | Gross | 222/410 X |

*Primary Examiner*—Robert G. Sheridan
*Attorney, Agent, or Firm*—Reilly and Hancock

[57] ABSTRACT

Materials to be fed through an aperture in a container are urged towards the aperture by rotary motion of the sidewalls of the container. The feeding of the materials is augmented by selectably positionable blades attached to move with the sidewalls but extendible into or out of the container interior so as to break up bridging effects of the material around the aperture. The blades can likewise be completely withdrawn from the container interior.

6 Claims, 6 Drawing Figures

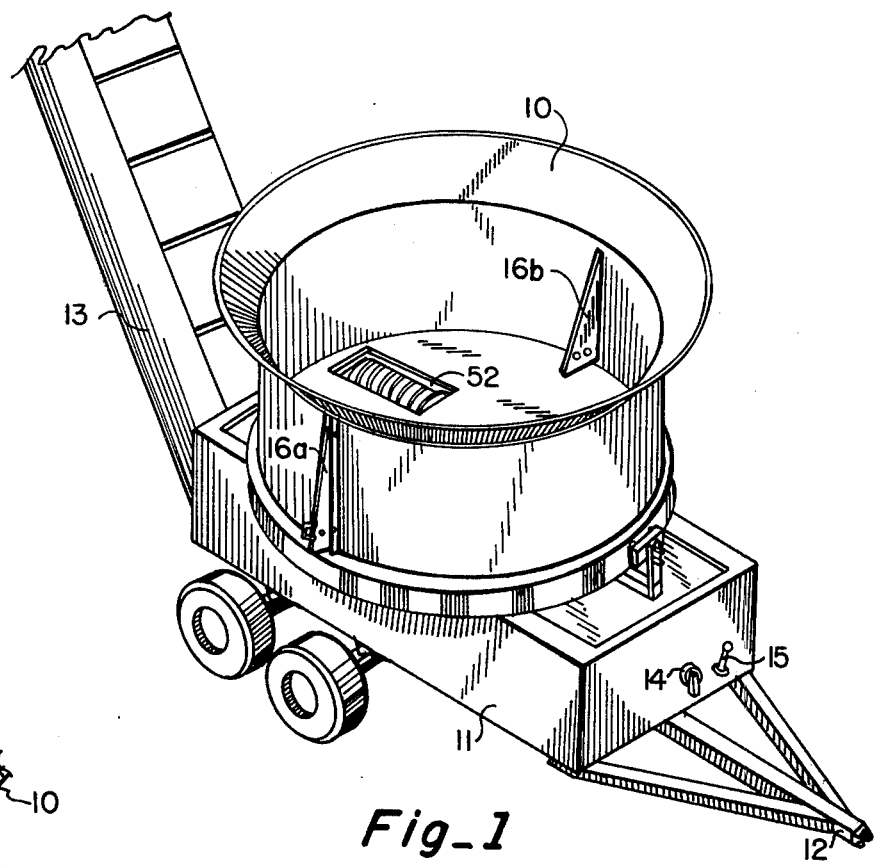
Fig_1
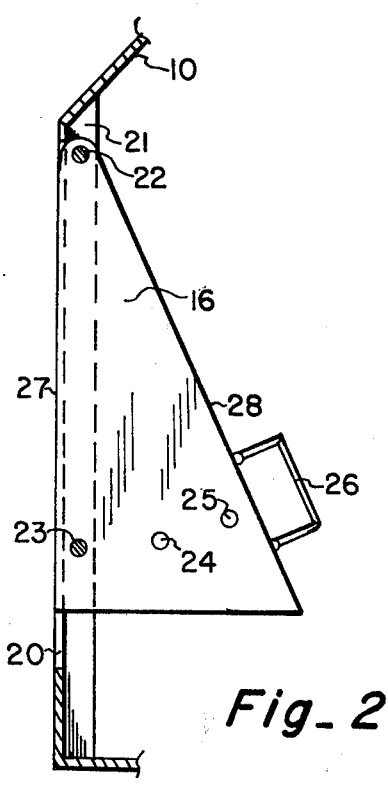
Fig_2

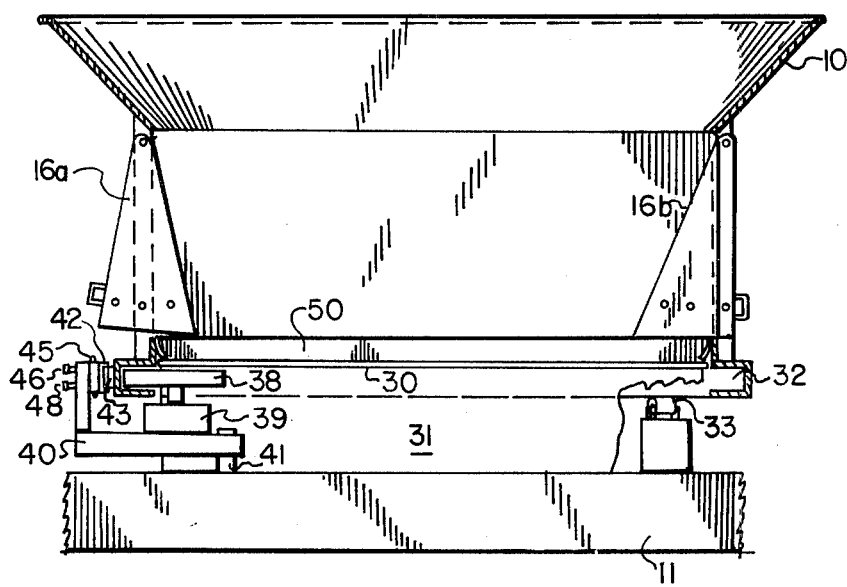
Fig_3
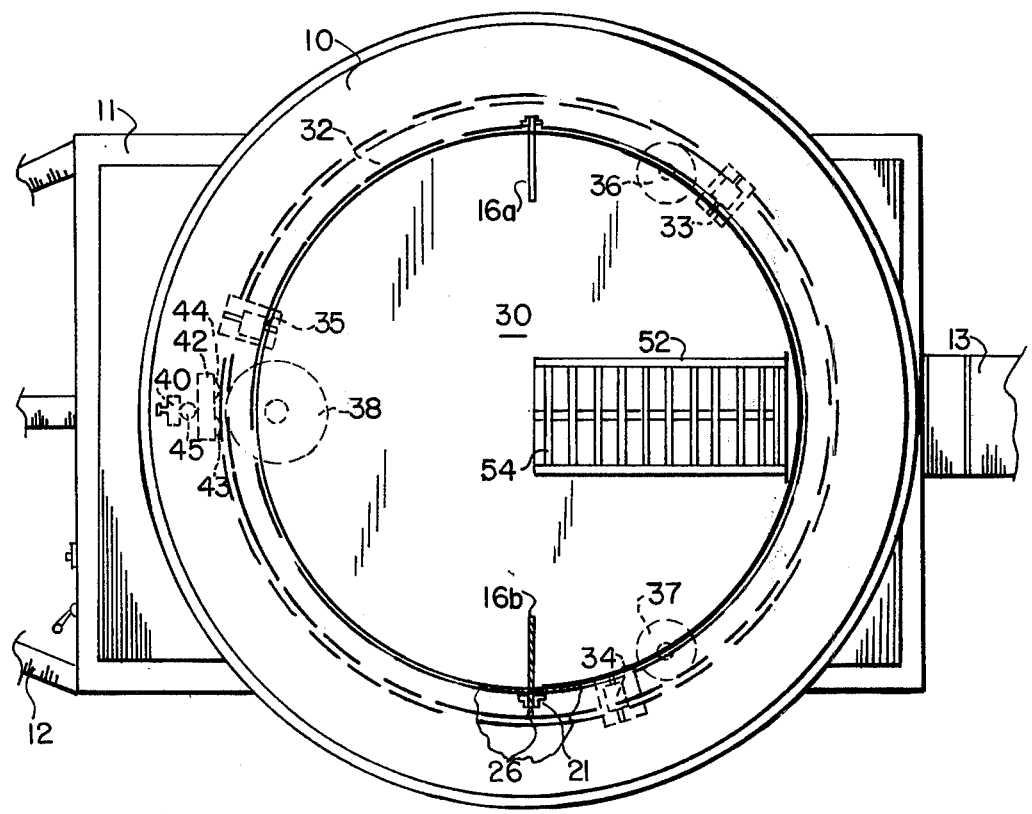
Fig_4

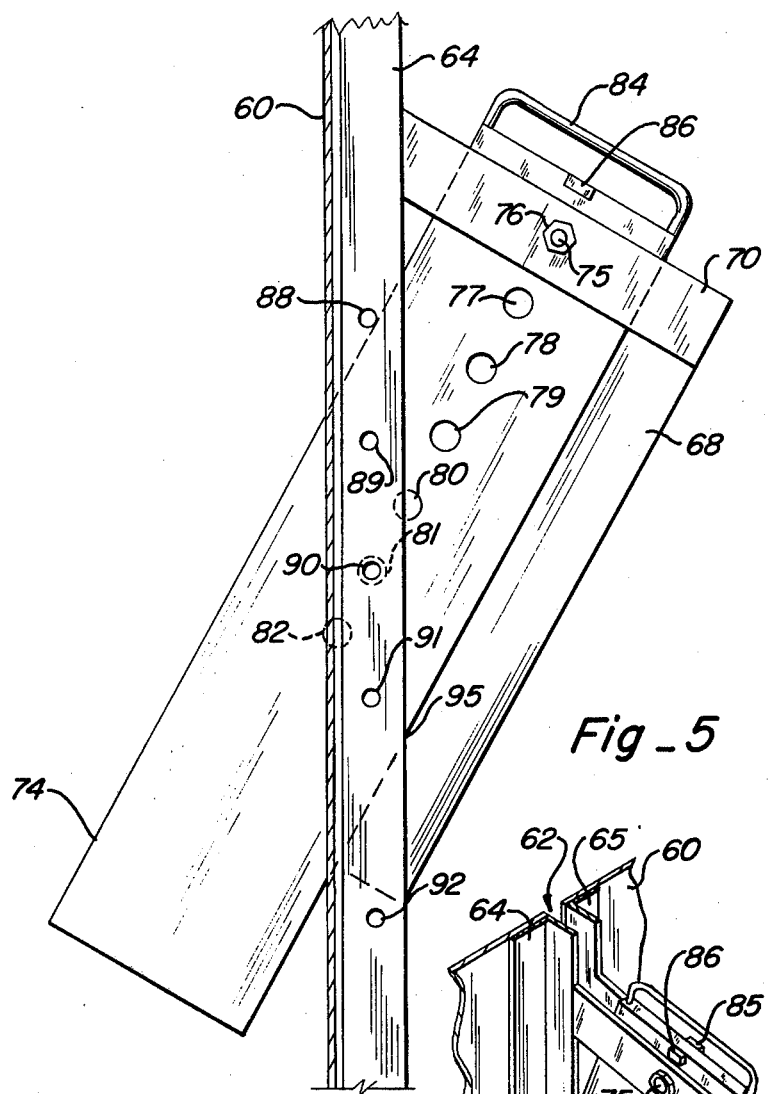
Fig_5
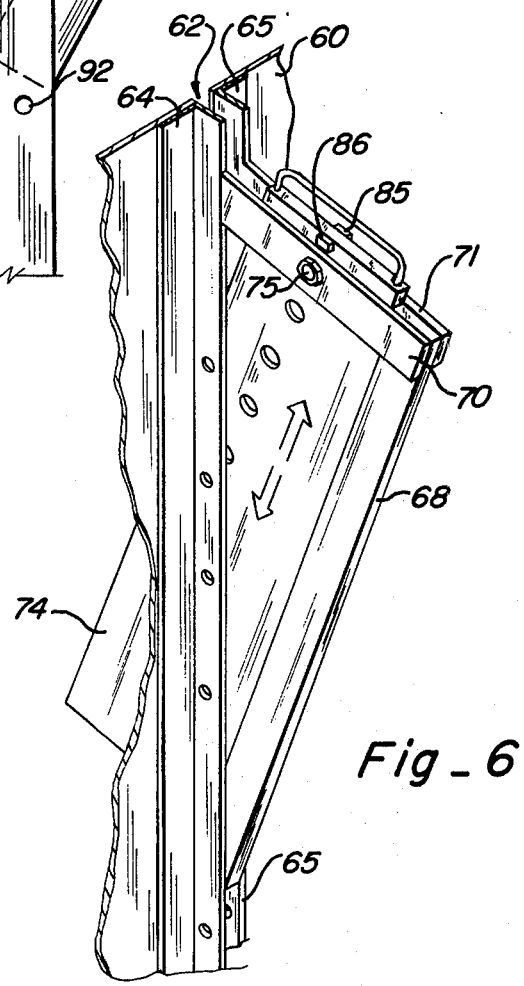
Fig_6

ADJUSTABLE SWEEPING APPARATUS FOR FEED GRINDERS AND THE LIKE

BACKGROUND OF THE INVENTION

This application is a continuation-in-part of application Ser. No. 539,821 filed Jan. 9, 1975, now abandoned, entitled ADJUSTABLE SWEEPING APPARATUS FOR FEED GRINDERS AND THE LIKE by Ernest A. Barcell, and assigned to the same assignee as this application.

This invention relates to apparatus for feeding materials from a container into a receiving aperture within the container. More particularly, this invention relates to apparatus for automatically feeding materials from a container into a location in proximity to the container wherein processing of the materials can be performed. The present invention is particularly useful in conjunction with feed grinders for chopping and loosening compacted feed materials to facilitate handling, mixing and consumption as livestock ration.

Crops used for livestock feed such as hay and the like are generally harvested into compact bales for ease of handling and storage. The compactness of such bales not only makes it difficult to mix the materials with grains, silage or other types of feed as needed for accurately balanced rations but is also more difficult for the livestock to eat. Further, the compactness of such bales causes greater wastage of the feed from trampling and scattering by the livestock. Accordingly, various devices have been developed for grinding the baled feed so as to loosen it and break up clumps thereof into sizes more easily handled by the livestock. Such prior art devices frequently employ a rotating hammermill located below a tub-like container so as to be fed through an aperture usually in the bottom floor of the container. With such an arrangement, the sidewalls of the container are rotated so as to urge the feed materials over the aperture. Dry materials will feed through the aperture reasonably well but tend to slip against the rotating sidewalls. Conversely, damp materials will tend to follow the sidewall motion but will more often produce bridging over the aperture as compared to dry materials. Furthermore, tightly compacted materials have a tendency to exhibit a bridging effect over the aperture and block entry of the materials into the hammermill section.

These problems have been attacked in the past by attaching extension plates to the inside of the container sidewalls so as to augment feeding and/or break up the aperture bridging. Unfortunately, the need for such extension plates cannot always be foreseen in advance. Thus, when the blockingbridge effect has taken place, it generally occurs after the container has been loaded and grinding operations actually started. Attachment or removal of the extension plates at this point is difficult and time consuming, often requiring substantial manual unloading of the container. Furthermore, changing the extension plate size involves substantially the same difficulty. It is not generally desirable to leave the extension plates attached so as to extend into the container since they tend to impede initial feeding of material into the aperture in the container. That is, these plates and, in some cases, even just the brackets for mounting the plates to the interior sidewall of the container will tend to hold the materials above the floor of the container when it has been initially loaded thereby impeding material feed into the aperture.

Thus, there has been a continuing need for an adjustable extension plate associated with the moving sidewalls of a tub grinder container which can be selectably and easily positioned within or completely removed from the container in a manner that does not require unloading of the container.

SUMMARY OF THE INVENTION

The present invention is an arrangement for permitting selectable placement of extension plates or paddles within the container section of a feed grinder device. The moving sidewalls of the device are adapted to retain the extension plates in a manner which permits movement of the extension blade between a fully retracted position and a fully extended position or any intermediate position from a point exterior to the container. The blade position can be adjusted regardless of the loaded status of the container. As will be described in greater detail hereinbelow for the preferred embodiments, one advantageous example of accomplishing this is to include one or more slots through the container sidewall with a baffle plate pivotally attached near the upper end of the slot and releasably attached at any of several positions at the other end of the slot. An alternative arrangement is to include one or more guide channels attached to the exterior of the container sidewall in proximity to the slot or slots through the sidewall to permit sliding of a plate or plates into and out of the container interior. Thus, the plate or plates can be positioned completely clear of the container interior while being extendible into the interior to the extent desired so as to facilitate churning of the materials within the container.

An object of this invention is to provide apparatus that will augment feeding of materials from within a container to an opening within the container.

Another object of this invention is to provide apparatus which facilitates removal of material bridging from a feed opening within a container.

A further object of this invention is to provide apparatus which will permit selection of the amount of churning of materials within a container by means easily accessible externally to the container.

Yet another object of this invention is to provide apparatus for selecting the amount of blade extension within a tub grinder for livestock feed by means accessible externally to the tub grinder but relatively independent of the loaded status of the grinder.

The foregoing and other objects, features and advantages of this invention will become more apparent in view of the following detailed description of exemplary preferred embodiments.

BRIEF DESCRIPTION OF THE DRAWINGS

FIG. 1 is a general perspective view of a mobile tub grinder incorporating one embodiment of the present invention.

FIG. 2 illustrates one example of an extending plate or blade useful in implementing the present invention.

FIG. 3 is a side partially sectioned view of the FIG. 1 embodiment.

FIG. 4 is a top view of the FIG. 1 embodiment.

FIG. 5 is a partially sectioned and broken side view of an alternate embodiment of this invention; and FIG. 6 is a perspective view of the FIG. 5 embodiment.

DETAILED DESCRIPTION OF THE PREFERRED EMBODIMENT

FIG. 1 shows a perspective view of a mobile livestock feed tub grinder including one exemplary implementation of the present invention. The device includes a generally tub-shaped container 10 which is top loaded with materials to be ground. The main frame 11 is shown mounted on wheels and including an attachment yoke 12 to permit movement by another vehicle (not shown). Broadly, the materials to be ground such as hay or the like are loaded into tub container 10, fed through an aperture 52 in the bottom of container 10 to a grinding arrangement and ultimately delivered by conveyor chute 13 to the desired place of storage or utilization.

Mounted within frame 11 is a power drive means for imparting rotary motion to the upper portion of tub 10 and also for powering the hammermill grinder located below the non-rotating floor of container 10. Obviously powering arrangements can be included for conveyor 13 if desired. The particular power system can be any suitable means such as hydraulic motors, electric motors or any of a wide variety of mechanical engines, clutches, couplers and transmissions. Typically the controls for the power drive are easily accessible on the exterior of the main frame 11 such as speed control knob 14 and rotary direction selector 15. Extending through slots in the sidewalls of container 10 are two paddle-like baffle plates or blades 16A and 16B which can be positioned between fully withdrawn and fully extended locations relative to the interior of container 10.

FIG. 2 illustrates an example of a positionable paddle plate 16 which is particularly attractive in view of its relatively low cost of fabrication. For this configuration, slot 20 extends vertically up the sidewall of container 10 and is sufficiently wide circumferentially to permit plate 16 to move therethrough. Two mounting brackets 21 are attached to the exterior surface of container 10 on either side of slot 20, only one bracket 21 being shown in FIG. 2 for purposes of clarity. The upper end of blade 16 is pivotally attached between brackets 21 at 22. A series of arcuately oriented holes 23–25 are located in proximity to the other end of blade 16 with bracket 21 having aligning holes therethrough which are shown in FIG. 2 as being in alignment with hole 23. A bolt, releasable spring-loaded pin or the like is passed through brackets 21 and the appropriately aligned one of holes 23–25 in plate 16. By releasing the lower bolt or pin through brackets 21 and grasping handle 26, plate 16 can be pivoted between the position shown in FIG. 2 wherein inner edge 27 is substantially in alignment with the interior surface of the sidewalls of container 10 and the fully extended position within container 10 wherein rear edge 28 of paddle 16 is in alignment with the outer edges of brackets 21. For the latter position, hole 25 is in alignment with the lower bores through brackets 21.

Although illustrated with a three-position adjustment for the preferred embodiment, it will be readily understood by those having normal skill in the art that a greater or lesser number of positions can be included in plate 16. Further, the positioning means can be implemented by several different configurations. For instance, the releasable pin configurations associated with bores 23–25 could be replaced with a worm gear arrangement, a powered plunger apparatus (i.e., hydraulic or electric solenoids) or the like. Plates such as 16 could also be pivotally mounted on hinges on the inner sidewalls of container 10 and positioning means such as a hydraulic piston attached for extending plates 16 into the container interior or pulling them back relatively flush with the sidewalls. Still further, plate 16 could be fabricated in a rectangular shape and additional positioning means associated with the upper edge thereof if desired, one example of an implementation of the invention along these lines being shown and described below in conjunction with FIGS. 5 and 6. The number of plates 16 arranged around tub 10 can be varied. However, it has been found that two diametrically positioned plates as shown is satisfactory for most applications. The generally triangular shape shown with the pivot attachment at 22 and selectable positions 23–25 is preferred since it permits adjustment of the plate relative to the interior of container 10 with the least effort and involves an apparatus which is relatively economic to fabricate.

FIG. 3 is a partially sectional side view showing elements of a tub grinder associated with retaining and rotating container 10. Circular floor 30 is attached to main frame 11 by means of a pair of upstanding channel beams 31 which are attached transversely across frame 11 with only the rearward beam 31 being shown in FIG. 3. Tub 10 has a lower circumferential channel 32 which is vertically supported at three points by rollers 33–35 as can be more clearly seen in FIG. 4. Floor 30 also has two adjustable follower wheels 36 and 37 attached to the underside thereof so as to extend into circumferential channel 32 thereby providing lateral positioning of container 10. At one edge of channel 32, drive wheel 38 frictionally engages the inner surface of channel 32 and is adapted to be rotated by motor 39. Motor 39 is mounted on arm 40 which is pivotally attached to main frame 11 at pin 41.

Attached to the upper extension of arm 40 is mounting box 42 which rotatably retains rollers 43 and 44 (note FIG. 4) against the outer peripheral edge of channel 32. Box 42 is pivotally retained by pin mount 45 with lateral tension thereof being provided by adjusting bolts 46 and 48 through arm 40. Thus channel 32 is frictionally clamped between drive wheel 38 and rollers 43 and 44 with the amount of such frictional engagement being adjustable via 46 and 48. By pivotally mounting arm 40 to frame 11 at pin 41, the drive assembly is substantially free to follow any variations of channel 32 without loss of drive engagement.

Adjustable extension paddles 16A and 16B are attached in FIGS. 3 and 4 substantially as described for FIG. 2. Note that a flexible skirt 50 can be attached along the lower inner peripheral edge of tub 10 so as to minimize escape of materials around the edge of fixed floor 30. The aperture 52 through floor 30 is best seen in FIG. 4 and opens into a lower hammermill grinder 54 which is typically composed of an arrangement of fixed and freely rotatable blades all of which are rotated to grind the materials dropping through apertures 52 as is well known by those having normal skill in the art. A replaceable screen (not shown) is attached to the lower edges of aperture 52 in surrounding relation below hammermill 54 so as to allow particles of sufficiently small size to be passed to conveyor elevator 13.

In summary, paddle plates 16 can be withdrawn from the interior of container 10 so as to be clear of material being loaded for grinding. If the material thereafter exhibits a bridging effect across aperture 52 as container 10 is rotated or fails to follow the rotary motion of sidewall 10 as it is rotated by pivotal drive 38, plates 16 can be extended inwardly or outwardly so as to break up this bridge and/or resume feeding of materials into hammermill 54. Further, this can be done without requiring access to the interior of container 10 or removal of any of the materials loaded therein.

An alternate embodiment for effecting the same general results as plate 16 is shown in FIGS. 5 and 6. In this embodiment, tub 60 is typically the same as tub 10 described in detail hereinbefore including the cylindrical sidewalls with outwardly flared upper flange surface, fixed floor, hammermill arrangement, rotary drive and the like. Further, the cylindrical sidewall has one or more vertical slots 62 (note FIG. 6) therethrough with two such slots diametrically positioned on opposite sides of tub 60 having been found satisfactory for most purposes. As best seen in FIG. 6, two L-shaped brackets 64 and 65 are attached to the exterior surface of tub 60 in surrounding relation to slot 62. Bar 68 and arms 70 and 71 are attached to each other in overlapped relation at one end as shown to form a guide framework via attachment to L-beams 64 and 65 as by welding, bolting or the like. Thus this guide frame is a rigid structure extending outwardly from the exterior of the sidewall of tub 60 thereby providing a guiding channel in which paddle plate 74 can be slidingly moved.

Arms 70 and 71 each have a hole transversely therethrough which align with one another and further can be selectably aligned with one of the holes 76–82 arrayed in spaced relation along and through plate 74. Bolt 75 is adapted for releasably securing plate 74 within the framework by passing through the aligned holes in arms 70 and 71 as well as through one of holes 76–82. Bolt 75 can be a conventional nut and bolt assembly, a clevis pin, a cotter pin retained shank, a spring biased releasable bolt or the like. A handle 84 is attached along one edge of plate 74 as shown to permit manual gripping thereof exteriorly from tub 60. The amount of extension of plate 74 into the interior of tub 60 can be selected by releasing bolt 75, sliding plate 60 within the guide frame so that an appropriate one of holes 76–82 are in alignment with the holes through arms 70 and 71, and replacing bolt 75 through these aligned holes. Note that any number of holes through plate 74 can be used and the lowermost hole 82 arranged for retaining plate 74 so that it does not extend into the interior of tub 60 at all. Blocks 85 and 86 are attached along the upper edge of plate 74 so as to engage the upper surfaces of arms 70 and 71 thereby preventing 74 from accidentally slipping into tub 60.

L-bracket member 64 is shown as having a series of holes 88–92 therethrough which align with a similar series of holes (not shown) in L-bracket member 65. Although primarily intended for attaching other accessory devices (not shown) inside of tub 60, holes 88–92 likewise can be used for the bolt 75 attachment location as via alignment with hole 90 in place of or in addition to the holes in arms 70 and 71. Furthermore, by appropriate modifications to plate 74 and alignment of the retaining holes, plate 74 can be pivotally positioned so as to vary the angle of extension thereof into tub 60.

The framework of arms 68, 70 and 71 preferably extends in an upward angle as shown in order to provide maximum side clearances particularly around the ends of the vehicle as tub 60 rotates. However, plate 74 and its guide frame could be oriented perpendicular to the lower exterior surface of tub 60 if desired.

In a typical grinder in accordance with FIGS. 5 and 6, tub 60 is fabricated of fourteen-gauge steel with three feet high vertical sidewalls defining a cylinder of ninety inches inside diameter. The outwardly flared circumferential lip or flange portion of tub 60 extends 13.83 inches vertically and 13.34 inches horizontally above the top of the cylindrical sidewalls. L-beams 64 and 65 are typically 33 inch long 2×2×0.25 inch angle beams with slot 62 being ⅜ inch wide and paddle plate being 5/16×6×26 inches with ¼×½×1 inch retaining blocks 85 and 86 welded to the upper edge of plate 74. Arms 70 and 71 are each ¼×2×10 ¼ inch steel bars angle cut and welded at one end to L-beams 64 and 65, respectively, and welded in overlapped and right angled relation to the other ends to a 5/16×2×22 ¼ inch bar 68. Bar 68 is welded or bolted between L-beams 64 and 65 at its lower end so that the upper surface intersects beams 64 and 65 at a junction point 95 (note FIG. 5) which is 9⅛ inches above the bottoms of bars 64 and 65 which are typically two to three inches above the bottom of the vertical sidewalls of tub 60 to accommodate the lower flange of the tub. The aligning holes 76–82 on plate 74 begin one inch below the upper edge thereof and are located equally spaced over one foot along the center line of plate 74. Holes 76–82 are 0.75 inch diameter while the holes through arms 70 and 71 are 9/16 inch in diameter to freely accept a half inch clevis pin or the like.

Although the present invention has been described with particularly relative to the foregoing exemplary preferred embodiment, various changes, modifications and additions will be readily apparent to those having normal skill in the art without departing from the spirit of the invention.

What is claimed is:

1. In a container apparatus having moving sidewalls for urging materials into an aperture, an improvement, comprising:
    plate means,
    means for attaching moving said plate means to the sidewalls of the container apparatus, and
    means selectably moving said plate means between at least a first location wherein said plate means is extended into the container for sweeping over the aperture in response to movement of the sidewall and a second location wherein said plate means is substantially withdrawn from the interior of the container, whereby said plate means when in said first location will augment urging of material within the container towards the aperture but will not interfere with loading of the container when in said second location.

2. Apparatus in accordance with claim 1 wherein the container has a fixed floor with the aperture located therein and the container sidewalls are in a drum configuration overlying the fixed floor, said attaching means including at least one slot in the container sidewall perpendicular to the floor and further including bracket means slidably retaining said plate means for permitting movement thereof through said slot, said selectable moving means including means for releasably securing said plate means in a plurality of locations relative to said bracket means.

3. Apparatus in accordance with claim 2 wherein said attaching means further includes means for pivotally attaching one end of said plate means to said bracket means near the upper extremity of said slot, said selectable moving means being arranged for retaining the other end of said plate means to said bracket means in proximity to the lower extremity of said slot.

4. Apparatus in accordance with claim 3 wherein said plate means has a plurality of bores therethrough along the said other end thereof with said bores arranged for aligning with a bore through said bracket means in proximity to the lower extremity thereof in response to pivotal movement of said plate means around said pivotal attaching means, said selectable moving means including a releasable pin means for selectable passage through said bracket means bore and the one of said plate means bores aligned therewith.

5. In a tub grinder having a container formed by a rotatable cylindrical sidewall and a fixed floor having an aperture therethrough opening into a downwardly located processing station wherein materials placed in the container are gravity fed through the aperture and urged towards the aperture in response to rotation of the cylindrical sidewall, an improvement comprising:
- a plurality of mounting means arranged around the circumference of the sidewall and each including a slot through the sidewall oriented perpendicular to the container floor and a pair of brackets each attached along opposite sides of said slot on the external surface of the sidewall,
- a plurality of elongated flat plate means each having a hole through one end and a plurality of bores through the other end arcuately arranged relative to said hole,
- a plurality of pin means each cooperating with a said hole of one of said plate means for pivotal attachment thereof between a said pair of brackets of a respective said mounting means, and
- a plurality of releasable pin means each attached to a respective said pair of brackets for cooperating with one of said arcuately arranged bores of the associated said flat plate means whereby said releasable pin means can be released and the associated said flat plate means positioned through one of said slots in a plane perpendicular to the container sidewall thereby permitting secured selection of the extent of protrusion of the said flat plate means in the interior of the container.

6. Apparatus in accordance with claim 5 wherein a first one of said bores of each said flat plate means cooperates with the associated said releasable pin means for retaining the elongated edge of its said flat plate means in substantial alignment with the inner surface of the sidewalls, the others of said bores cooperating with the associated said releasable pin means for retaining said flat plate means in sequential amounts of extension into the interior of the container.

* * * * *

UNITED STATES PATENT OFFICE
CERTIFICATE OF CORRECTION

Patent No. 4,003,502            Dated January 18, 1977

Inventor(s) Ernest A. Barcell

It is certified that error appears in the above-identified patent and that said Letters Patent are hereby corrected as shown below:

Column 1, line 68, cancel "impedding" and substitute --impeding--.

Column 2, line 60, cancel "extending" and substitute --extendible--.

Column 6, line 32, cancel "particularly" and substitute --particularity--.

IN THE CLAIMS:

Claim 1, Column 6, line 42, cancel "moving".

Signed and Sealed this sixteenth Day of August 1977

[SEAL]

Attest:

RUTH C. MASON
*Attesting Officer*

C. MARSHALL DANN
*Commissioner of Patents and Trademarks*